March 11, 1958 H. HÄLSIG 2,826,091
MOTOR VEHICLE HAND BRAKE MECHANISMS
Filed Oct. 31, 1952
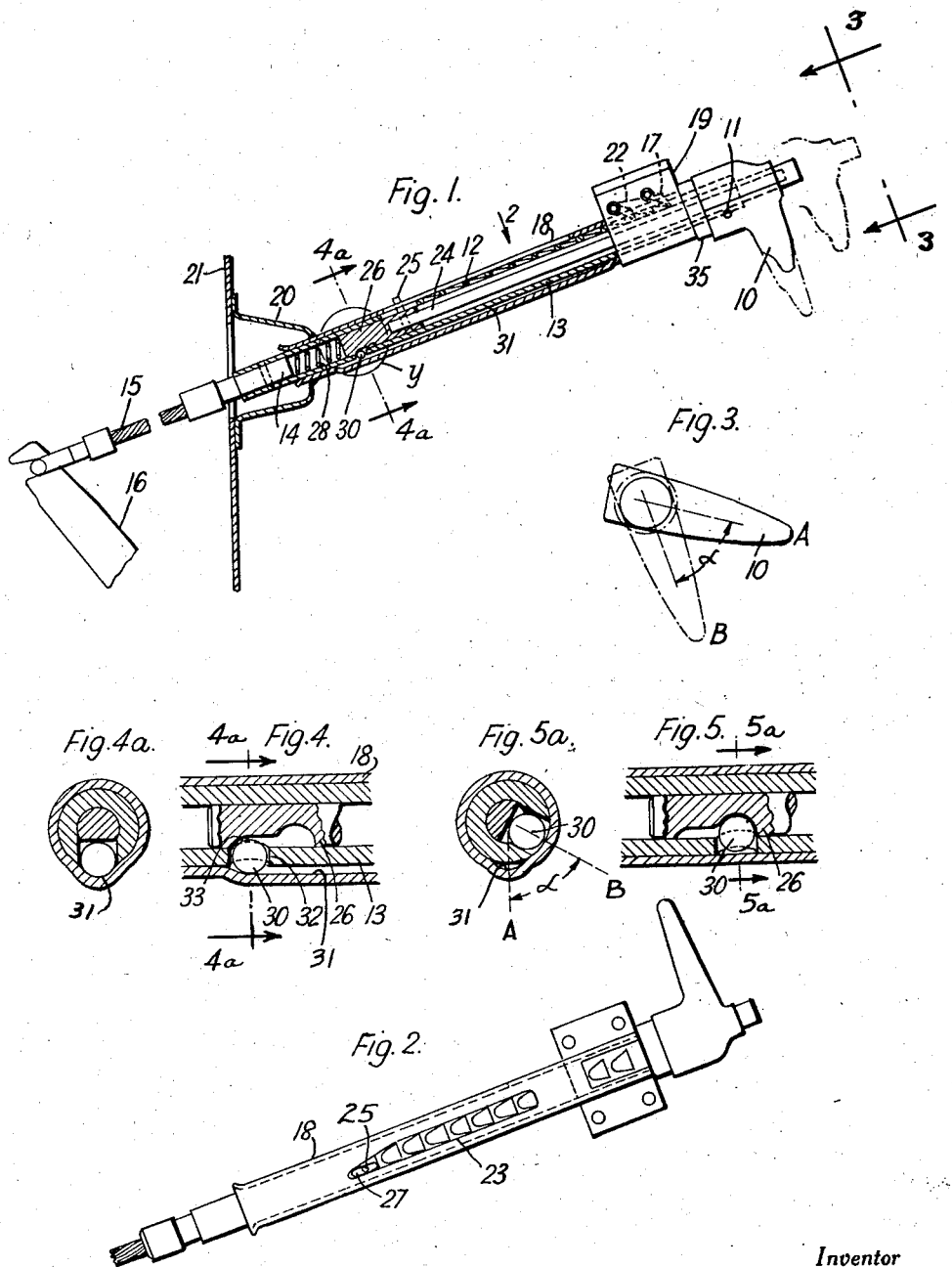
Inventor
Hans Hälsig
By Willits, Helsing & Baillio
Attorneys 2,826,091
Patented Mar. 11, 1958

2,826,091

MOTOR VEHICLE HAND BRAKE MECHANISMS

Hans Hälsig, Russelsheim (Main), Germany, assignor to General Motors Corporation, Detroit, Mich., a corporation of Delaware Application October 31, 1952, Serial No. 318,111

Claims priority, application Germany November 14, 1951

8 Claims. (Cl. 74—503)

This invention relates to hand brake mechanisms, particularly for motor vehicles.

More particularly the invention relates to hand brake mechanisms in which the operating rod is slidable in a tubular member and can be locked in a position in which the brake is applied.

It is desirable to be able to lock the mechanism in such a position so as to avoid inadvertent release of the brake, as by catching the control handle on the clothes of the driver or passengers.

The object of the invention is to produce simple means to prevent inadvertent release of the operating rod of a brake mechanism.

The invention is applicable to a motor vehicle hand brake mechanism comprising a tubular guide member, a tubular operating rod slidable in said member, and a handle on one end of said rod by which the rod can be turned to lock the mechanism.

The invention can be applied to a brake mechanism in which the brake operating rod is lockable in any one of a number of different positions. A feature of the invention is that the main parts of the mechanism can be fabricated by stamping out of sheet metal.

These and other objects of the invention as well as its construction and function will more fully appear from the following detailed description as illustrated by the attached drawings which show one embodiment of the invention.

In the drawings:

Figure 1 is an elevation partly in section of a brake mechanism embodying the invention;

Figure 2 is a plan of the brake mechanism viewed in the direction of arrow 2 in Figure 1;

Figure 3 is an end elevation in the direction of arrow 3 of an operating handle which is part of the mechanism shown in Figure 1, the dash-dot lines showing different positions of the handle;

Figure 4 is an enlarged detail of the area marked Y in Figure 1 but with the mechanism in a different position;

Figure 4a is an enlarged section on line 4a—4a of Figures 1 and 4;

Figure 5 is similar to Figure 4 but the mechanism is in a still further position;

Figure 5a is a section on line 5a—5a of Figure 5.

The brake mechanism shown in Figure 1 comprises a tubular operating rod 13 connected by a cable 15 to a brake lever 16. On the end of rod 13 remote from the cable 15 is an operating handle 10 which is held in place by a pin 11. The rod 13 is slidable in a tubular guide member 18 supported at one end by a bracket 20 welded to a dashboard 21 of a motor vehicle and at the other end by a bracket 19.

In the wall of rod 13 are ratchet teeth 12 which cooperate with a pair of pawls 17 pivoted on the guide member 18 and so spaced that only one of the pawls 17 engages a tooth 12 at any time. The pawls 17 are urged against the guide member 18 by a spring 22.

Slidable in rod 13 is a plunger 26 to which is attached a push rod 24 which projects through an aperture in the handle 10 to form a push-button. The plunger 26 is joined to the push-rod 24 by a pin 25 which passes through a slot 27 (Figure 2) in the rod 13 and a slot 23 in the support member 18. The pin 25 engages the edges of the slot 27 thereby limiting the movement of, and guiding, the plunger 26 and the edges of the slot 23 limit rotation of the handle 10. The plunger 26 is held off the end 14 of rod 13 by a spring 28 of such length that the push-rod 24 projects through the handle 10.

In the guide member 18 is a groove 31 and in rod 13 is an aperture 32 in which is a ball 30, the radial position of which is primarily determined by a recess 33 in plunger 14.

In the inoperative position of the brake mechanism the handle 10 is in the position shown in firm line in Figures 1 and 3 and the plunger and ball are in the positions shown in Figures 4 and 4a. To apply the brake the handle 10 is pulled outwardly (to the right in Figure 1) and when it has been pulled out sufficiently one of the pawls 17 engages a ratchet tooth 12 to hold the rod 13 in position and the ball 30 rests in the groove 31 (Figures 4 and 4a) thereby locking the mechanism against inadvertent release.

To release the mechanism the push-rod 24 is moved inwardly of the rod 13 thereby moving the plunger 26 against the action of spring 28 from the position shown in Figure 4 to that shown in Figure 5. The rod 13 can then be rotated through an angle α, from position A (firm line) to position B (dotted line), the ball 30 moving into the larger part of recess 33 as the rod 13 moves the ball 30 out of the groove 31 into the position of Figure 5a.

The teeth 12 are thus moved out of engagement with pawls 17 and the brake operating rod 13 can then be returned to the inoperative position to which it is guided by pin 25 in slot 23.

The use of a pair of pawls 17 enables the mechanism to be locked in a larger number of positions and is also a safety device in case one of the pawls 17 should stick or fail to engage a tooth 12.

We claim:

1. A motor vehicle handbrake mechanism comprising a tubular guide member, a tubular operating rod slidable in said member, said tubular operating rod being rotatable in said member between one rotary position and another rotary position, cooperating locking means on said member and said rod to lock said member and said rod in said one rotary position and to release said rod from said member in said other rotary position, a handle on one end of said rod by which the rod can be turned to said one rotary position to lock the mechanism and means to prevent inadvertent release of the operating rod, said last means comprising a plunger connected by a push-rod to a push-button protruding from the handle.

2. A motor vehicle handbrake mechanism comprising a tubular guide member, a tubular operating rod slidable in said member, said tubular operating rod being rotatable in said member between one rotary position and another rotary position, cooperating locking means on said member and said rod to lock said member and said rod in said one rotary position and to release said rod from said member in said other rotary position, a handle on one end of said rod by which the rod can be turned to said one rotary position to lock the mechanism in any one of a number of operative positions, and means to prevent inadvertent release of the operating rod, said last means including a plunger connected by a push-rod to a push-button protruding from the handle, said plunger cooperating with a ball contained in an aperture in the operating rod and movable into and out of a groove in the guide member by movement of said plunger.

3. A motor vehicle handbrake mechanism comprising a tubular guide member, a tubular operating rod slidable in said member, said tubular operating rod being rotatable in said member between one rotary position and another rotary position, cooperating locking means on said member and said rod to lock said member and said rod in said one rotary position and to release said rod from said member in said other rotary position, a handle on one end of said rod by which the rod can be turned to said one rotary position to lock the mechanism and means to prevent inadvertent release of the operating rod, said last means comprising a ball seated in a radial aperture in the operating rod, the ball being wedged or released in a longitudinally grooved plunger and a groove in the guide member under the action of a spring.

4. A motor vehicle handbrake mechanism comprising a tubular guide member, a tubular operating rod slidable in said member, said tubular operating rod being rotatable in said member between one rotary position and another rotary position, cooperating locking means on said member and said rod to lock said member and said rod in said one rotary position and to release said rod from said member in said other rotary position, a handle on one end of said rod by which the rod can be turned to said one rotary position to lock the mechanism and means to prevent inadvertent release of the operating rod, said last means comprising a ball seated in a radial aperture in the operating rod, the ball being wedged or released in a longitudinally grooved plunger and a groove in the guide member under the action of a spring, said longitudinally grooved plunger being movable by a push-rod connected to a push-button which protrudes from the handle.

5. A motor vehicle handbrake mechanism comprising a tubular guide member, a tubular operating rod slidable in said member, said tubular operating rod being rotatable in said member between one rotary position and another rotary position, cooperating locking means on said member and said rod to lock said member and said rod in said one rotary position and to release said rod from said memebr in said other rotary position, a handle on one end of said rod by which the rod can be turned to said one rotary position to lock the mechanism and means to prevent inadvertent release of the operating rod, said last means comprising a ball seated in a radial aperture in the operating rod, the ball being wedged or released in a longitudinally grooved plunger and a groove in the guide member under the action of a spring, said longitudinally grooved plunger being movable by a push-rod connected to a push-button which protrudes through the handle, and said operating rod, guide member and plunger being formed from sheet metal pressings.

6. A motor vehicle handbrake mechanism comprising a tubular guide member, a tubular operating rod slidable in said member, said tubular operating rod being rotatable in said member between one rotary position and another rotary position, cooperating locking means on said member and said rod to lock said member and said rod in said one rotary position and to release said rod from said member in said other rotary position, a handle on one end of said rod by which the rod can be turned to said one rotary position to lock the mechanism in any one of a number of operative positions, and means to prevent inadvertent release of the operating rod, said last means comprising a ball seated in a radial aperture in the operating rod, the ball being wedged or released in a longitudinally grooved plunger and a groove in the guide member under the action of a spring.

7. A motor vehicle handbrake mechanism comprising a tubular guide member, a tubular operating rod slidable in said member, said tubular operating rod being rotatable in said member between one rotary position and another rotary position, cooperating locking means on said member and said rod to lock said member and said rod in said one rotary position and to release said rod from said member in said other rotary position, a handle on one end of said rod by which the rod can be turned to said one rotary position to lock the mechanism in any one of a number of operative positions, and means to prevent inadvertent release of the operating rod, said last means comprising a ball seated in a radial aperture in the operating rod, the ball being wedged or released in a longitudinally grooved plunger and a groove in the guide member under the action of a spring, said plunger being connected by a push-rod to a push-button protruding from the handle.

8. A motor vehicle handbrake mechanism comprising a tubular guide member, a tubular operating rod slidable in said member, said tubular operating rod being rotatable in said member between one rotary position and another rotary position, coperating locking means on said member and said rod to lock said member and said rod in said one rotary position and to release said rod from said member in said other rotary position, a handle on one end of said rod by which the rod can be turned to said one rotary position to lock the mechanism in any one of a number of operative positions, and means to prevent inadvertent release of the operating rod, said last means comprising a ball seated in a radial aperture in the operating rod, the ball being wedged or released in a longitudinally grooved plunger and a groove in the guide member under the action of a spring, said longitudinally grooved plunger being movable by a push-rod connected to a push-button which protrudes through the handle, and said operating rod, guide member and plunger being formed from sheet metal pressings.

References Cited in the file of this patent

UNITED STATES PATENTS

| | | |
|---|---|---|
| 2,161,661 | Arens | June 6, 1939 |
| 2,177,456 | Irving | Oct. 24, 1939 |
| 2,340,830 | Arens | Feb. 1, 1944 |
| 2,496,931 | Brouse | Feb. 7, 1950 |
| 2,559,197 | Norton | July 3, 1951 |
| 2,631,470 | Sandberg | Mar. 17, 1953 |
| 2,666,339 | Schwarz | Jan. 19, 1954 |
| 2,744,419 | Chayne | May 8, 1956 |

FOREIGN PATENTS

| | | |
|---|---|---|
| 582,158 | Great Britain | Nov. 6, 1946 |